United States Patent
Tofano

(10) Patent No.: US 8,719,235 B2
(45) Date of Patent: May 6, 2014

(54) CONTROLLING TAPE LAYOUT FOR DE-DUPLICATION

(76) Inventor: Jeffrey Tofano, San Jose, CA (US)

(\*) Notice: Subject to any disclaimer, the term of this patent is extended or adjusted under 35 U.S.C. 154(b) by 46 days.

(21) Appl. No.: 13/373,984

(22) Filed: Dec. 7, 2011

(65) Prior Publication Data
US 2013/0148227 A1    Jun. 13, 2013

(51) Int. Cl.
*G06F 17/30* (2006.01)

(52) U.S. Cl.
USPC ............ 707/692; 707/667; 707/828; 711/4; 711/118; 711/162

(58) Field of Classification Search
CPC . G06F 3/0608; G06F 3/0641; G06F 11/1453; G06F 17/30489; G06F 2212/213
USPC .............. 707/813, 692, 667, 828; 711/4, 118, 711/162
See application file for complete search history.

(56) References Cited

U.S. PATENT DOCUMENTS

| | | | |
|---|---|---|---|
| 8,131,924 B1* | 3/2012 | Frandzel et al. | 711/113 |
| 2005/0193235 A1* | 9/2005 | Sandorfi et al. | 714/6 |
| 2009/0049260 A1* | 2/2009 | Upadhyayula | 711/162 |
| 2009/0182789 A1* | 7/2009 | Sandorfi et al. | 707/204 |
| 2010/0205389 A1* | 8/2010 | Kishi | 711/162 |
| 2011/0022718 A1* | 1/2011 | Evans et al. | 709/231 |
| 2011/0125950 A1* | 5/2011 | Haustein et al. | 711/4 |
| 2011/0145523 A1* | 6/2011 | Gupta et al. | 711/159 |
| 2011/0239097 A1* | 9/2011 | Bates et al. | 714/807 |
| 2012/0047324 A1* | 2/2012 | Wideman | 711/111 |
| 2012/0047328 A1* | 2/2012 | Williams et al. | 711/118 |
| 2012/0106309 A1* | 5/2012 | Oishi | 369/53.44 |
| 2012/0109894 A1* | 5/2012 | Kishi | 707/640 |
| 2012/0158882 A1* | 6/2012 | Oehme et al. | 709/213 |
| 2012/0239630 A1* | 9/2012 | Wideman et al. | 707/692 |
| 2013/0013567 A1* | 1/2013 | Constantinescu et al. | 707/667 |

\* cited by examiner

*Primary Examiner* — Dennis Truong

(57) ABSTRACT

Example methods and apparatus concern creating and/or manipulating a tape-specific layout for a tape based de-duplication repository. One example apparatus include a processor, a memory, a set of logics and an interface to connect the processor, the memory, and the set of logics. The apparatus may include a tape layout logic configured to determine the tape-specific layout for a de-duplication data set. The tape-specific layout may be based on forensic data acquired for the de-duplication data set. The apparatus may also include a write logic configured to write the de-duplication data set to a tape according to the tape-specific layout. The forensic data may identify, for example, the order in which sub-blocks are accessed, reference counts, access frequency, access groups, and other access information.

28 Claims, 10 Drawing Sheets

CONTROLLING TAPE LAYOUT FOR DE-DUPLICATION

BACKGROUND

De-duplication may be referred to as "dedupe". A dedupe data set may include an index, a repository of sub-blocks, and re-creation information. The index may be configured to facilitate locating a stored sub-block. The re-creation information may be configured to facilitate assembling related sub-blocks into larger items (e.g., files). The repository of sub-blocks may be configured to ease accessing stored sub-blocks. A dedupe system creates and/or manages the data set to facilitate determining whether a sub-block under consideration is a duplicate sub-block or a unique sub-block and to facilitate reducing either the amount of duplicate data stored or the amount of duplicate data transmitted. The dedupe data set is stored on physical media on physical devices.

One physical medium and device on which a dedupe data set may be stored is random access memory (RAM). RAM provides relatively fast random access as compared to other random access devices (e.g., disk). RAM is generally readily accessible to a processor executing dedupe processes. RAM is also relatively fast compared to other media. When sub-blocks are stored in RAM, the sub-blocks can be acquired using random accesses that may involve a bus access but no external input/output (i/o). Similarly, when information for re-creating a larger item (e.g., file) is stored in RAM, the information can be quickly accessed. Additionally, when the index is stored in RAM, index locations can be accessed using efficient random accesses.

Unfortunately, RAM is currently a finite resource and is also a relatively expensive storage medium as compared to other physical devices (e.g., disk, tape). Thus a device performing a de-duplication process likely has access to a finite amount of RAM. Since RAM is finite, neither all the sub-blocks for a dedupe data set, nor the re-creation information, nor the index can be stored completely in RAM. Therefore, at least some sub-blocks, re-creation information, and/or index portions are stored on some media and some device other than RAM. Conventionally, there may have been insufficient attention paid to how sub-blocks, re-creation information, and/or index portions should be arranged on these other storage media and devices. When attention was directed at how dedupe data, re-creation information, and/or index portions should be stored on other media and devices, the attention was typically applied at the generic, theoretical level, rather than at the actual observed data set level.

Disk is one additional storage medium and device used in dedupe. A disk generally includes a spinnable platter(s) with a movable read/write head(s). Disks, like RAM, are generally considered to be random access devices. While both RAM and disk provide random access, disk accesses generally take longer than RAM accesses because the platter(s) needs to be spun to a certain sector and the read/write head(s) need to be positioned over a certain track. Since the spinning and repositioning can be performed within a short enough period of time, the disk is considered to be random access. Thus, sub-blocks, re-creation information, and/or index portions may be available on disk through random accesses, although these random accesses are slower than random accesses to RAM. The disk may also be slower because the disk may not be as directly connected to a processor as RAM. For example, a disk may be connected through a disk controller that provides access to an external device.

Although random access is useful, sequential access, even to memory or a disk, may provide improved input and/or output in certain situations, particularly when large amounts of data are being read and/or written. Thus, schemes for improving disk access for dedupe systems have been attempted. These schemes typically involve finding ways to minimize the number of disk i/o operations because, although the disk access is random, it is still significantly slower than RAM access.

Tape is another storage medium used for storing sub-blocks, re-creation information, and/or an index. Unlike RAM or disk, which generally include both the storage medium and the device for accessing the storage medium, a tape may reside external to its access device (e.g., tape drive). Thus, while RAM is generally always in the same place in an apparatus (e.g., computer) and while a disk is generally always in the same place in a system (e.g., server), a tape may be moved from tape drive to tape drive. Also, while the same RAM and disk are generally always available in a system, different tapes may be available to a system. Thus, different considerations may exist for planning for tape usage in de-duplication systems.

FIG. 1 illustrates the logical components 100 and the physical components 110 described above. A dedupe data set may include an index 102, re-creation information 104, and a sub-block repository 106. These logical items may be arranged in a variety of data structures. For example, an index 102 may be arranged as a linear index, as a binary tree, as an n-ary tree, and in other ways. The data structures are stored on physical devices 110. The physical devices can include, but are not limited to, RAM 112, disk 114, and tape 116. In different embodiments, the data structures are stored on combinations of the physical devices 110.

A tape in a tape drive is conceptually equivalent to a disk with respect to reading and writing. Both require repositioning the media so that the read/write head(s) can access data stored at a certain location. Both have well-defined maximum times for positioning any location on the media for access by the read/write head. However, tapes and tape drives are generally not considered random access media and devices due to the time required to (re)position a tape for reading and/or writing. Tapes are more generally considered to be sequential access media. While tapes may have slower access times than disk for some operations, tapes may have vastly superior access times for other operations. For example, for large-scale sequential input/output, tapes may significantly outperform disk. Also, since tapes in an extensible tape library provide theoretically infinite storage, tapes are suitable for many de-duplication applications.

One operation performed by dedupe systems is finding sub-blocks in one data item (e.g., file) that are related to sub-blocks in another data item (e.g., file) so that the duplicate items can removed. Finding related (e.g., duplicate, similar) sub-blocks may involve accessing both an index and a repository. As described above, RAM, disk, and tape may have different strengths and weaknesses and may have different performance characteristics for different operations. Therefore, example methods and devices concern storing data on tape and retrieving data from tape in manners that increase efficiency for some de-duplication operations.

The foregoing statements are not intended to constitute an admission that any patent, publication or other information referred to herein is prior art with respect to this disclosure. Rather, these statements serve to present a general discussion of technology and associated issues in the technology.

BRIEF DESCRIPTION OF THE DRAWINGS

The accompanying drawings, which are incorporated in and constitute a part of the specification, illustrate various example systems, methods, and other example embodiments of various aspects of the invention. The illustrated element boundaries (e.g., boxes, groups of boxes, or other shapes) in the figures represent one example of the boundaries. In some examples one element can be designed as multiple elements or multiple elements can be designed as one element. In some examples, an element shown as an internal component of another element can be implemented as an external component and vice versa. Furthermore, elements may not be drawn to scale.

DETAILED DESCRIPTION

In one embodiment, example methods and devices create and/or manipulate a de-duplication sub-block repository for a tape. In another embodiment, example methods and devices create and/or manipulate a de-duplication index for a tape based repository. In yet another embodiment, example methods and devices create and/or manipulate de-duplication re-creation information for a tape based repository. In one embodiment, example methods and devices create and/or manipulate combinations of a de-duplication sub-block repository, index, and re-creation information for a tape. The repository, index, and re-creation information can be placed on a tape according to a plan specific for tape based storage used in dedupe. The plan can be specific to a certain data set on a certain tape resident in a certain tape drive.

Figure 1:
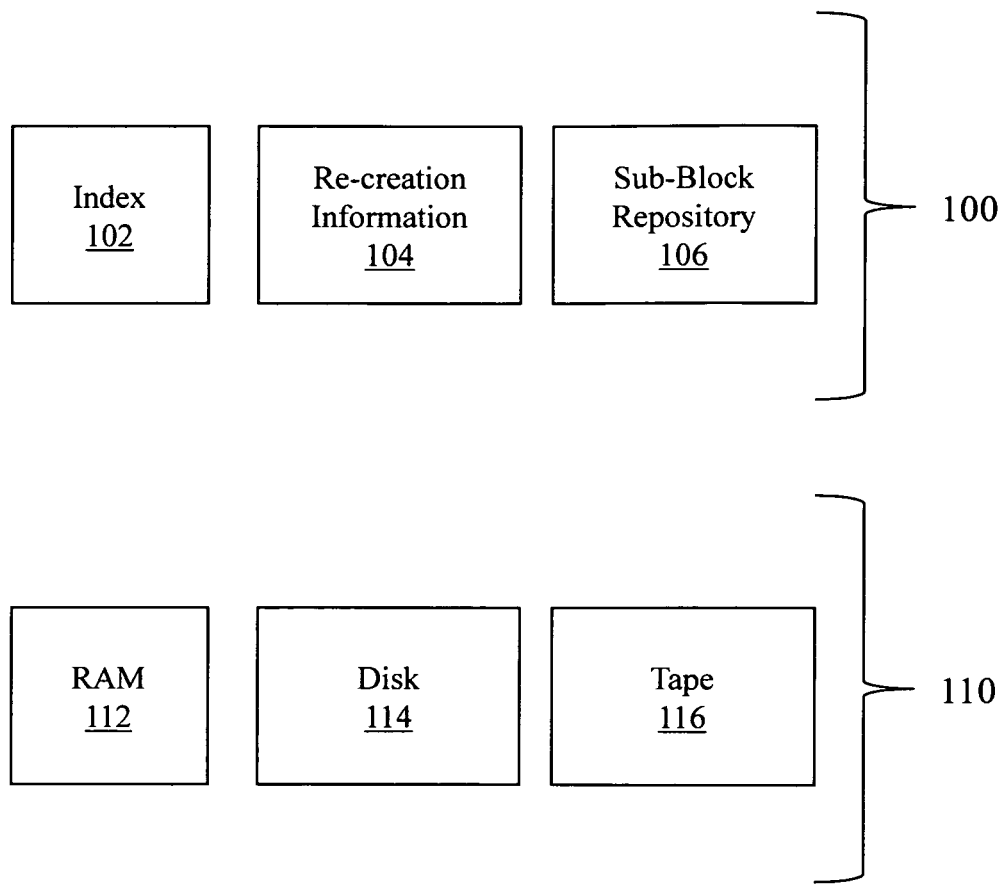
FIG. 1 illustrates logical portions of a de-duplication (dedupe) data set and physical devices that may store the logical portions.
Figure 2:
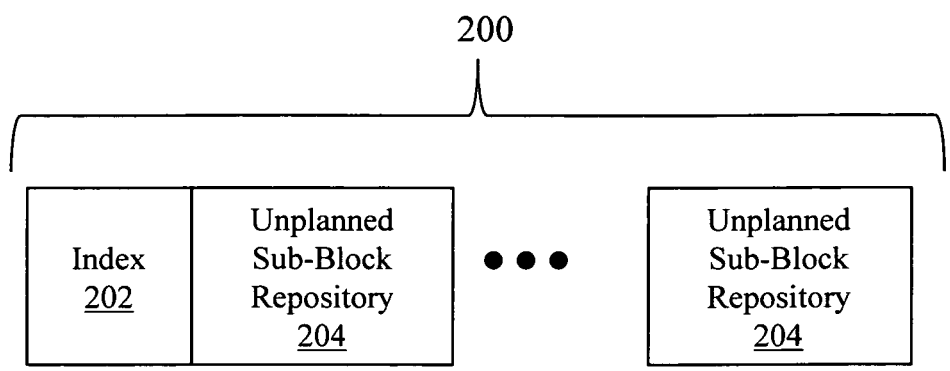
FIG. 2 illustrates a tape layout.

In one aspect, de-duplication is concerned with reducing the storage and/or transmission bandwidth requirements for a data set. Initially, some de-duplication approaches assumed that data blocks would likely be substantially equal with respect to their impact on de-duplication. Thus, to the extent that tapes were used to support conventional dedupe, they may have had an unsophisticated layout similar to that described in FIG. 2. For example, a tape 200 may have simply had an index 202 placed at the start of the tape 200 with an unplanned sub-block repository 204. The unplanned sub-block repository 204 may have simply been written in an ad hoc (e.g., as encountered) basis.

However, over time, some characteristics of operating de-duplication systems have become apparent. One observation is that not all sub-blocks are equal in their effect on dedupe. This observation is related to the fact that not all sub-blocks are accessed with the same frequency. Some sub-blocks may be more frequently accessed while others are rarely accessed. The observation is also related to the fact that sub-blocks frequently have different reference counts. For example, some sub-blocks are present in many files (e.g., high reference count) while some sub-blocks are present in few files (e.g., low reference count). Additionally, some sub-blocks are unique sub-blocks while other sub-blocks, although technically unique, are actually very similar to other sub-blocks. Some sub-blocks also form the basis for many slightly altered delta sub-blocks. Thus, not all sub-blocks are equal.

Figure 3:
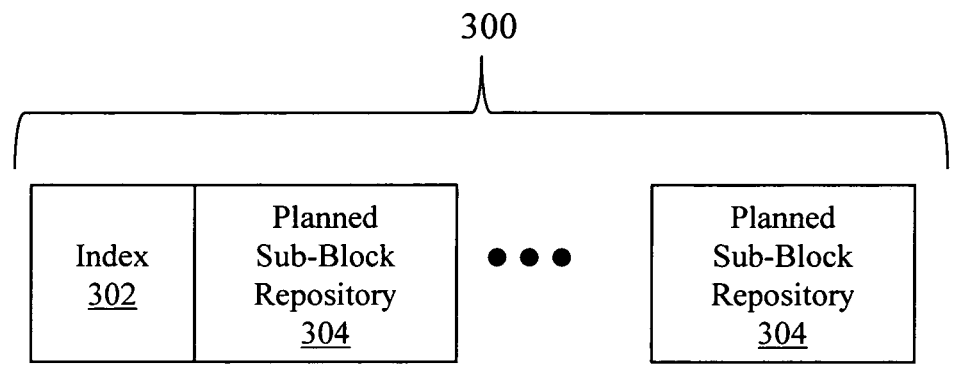
FIG. 3 illustrates a tape layout.

FIG. 3 illustrates a conceptual difference between tape layouts produced by conventional systems and tape layouts produced by example methods and devices described herein. Rather than simply producing an unplanned sub-block repository, tape 300 includes an index 302 and a planned sub-block repository 304. More complex layouts are described later. The planned sub-block repository may be built as a function of the observations made about actual dedupe data sets and processes. For example, sub-blocks may be placed in the sub-block repository according to a plan, rather than in an ad hoc basis. The plan may be based on observations.

Another observation about actual dedupe data sets and processes concerns how sub-blocks are accessed. Truly random sub-block access is more rare than some conventional systems assumed. Instead of purely random access, sub-blocks tend to be accessed in related groups. For example, when a larger block of data (e.g., a file) has been deduped, depending on how the sub-blocks were stored, it is likely that accessing one sub-block will accurately predict that a related set (e.g., the other sub-blocks for the file) will soon be accessed. Conventional systems may take advantage of these relationships in anticipatory buffering schemes. However, the anticipatory buffering typically performs numerous random accesses to acquire the related subset of sub-blocks.

When one type of sub-block (e.g., a delta sub-block) is accessed, it may be more likely that the basis sub-block to which the delta sub-block is related is about to be accessed. A delta sub-block is a sub-block that is described by differences between the delta sub-block and a basis sub-block. For example, a delta sub-block description may recite that the delta sub-block is the same as another sub-block except that bytes 9 and 13 are capital "E" instead of lower case "e". One skilled in the art is familiar with the concept of a delta sub-block in dedupe.

Since access patterns may be observable, not random, and thus understandable, in one embodiment, example methods and devices may produce and maintain a tape based repository in a manner that accounts for observed patterns. Example tape-based repositories may not be typical repositories configured to store sub-blocks so that most or essentially all sub-blocks are logically equidistant from an entity that will access a sub-block (e.g., process, device). Being logically equidistant may include, for example, traversing an equal number of data structures and/or consuming an equal number of random (e.g., RAM, disk) accesses to be accessed.

Example methods and devices may create, manipulate, and/or re-create a tape layout based on forensic data accumulated for a data set. This forensic data may also be referred to as second generation data. The second generation data may facilitate ordering sub-blocks to take advantage of efficient sequential i/o associated with tape storage. More generally, the forensic data facilitates placing data in a storage medium in a manner suited to the constraints of the storage medium and/or storage device.

The second generation data may identify, for example, the order in which sub-blocks are being accessed, groups of sub-blocks being accessed together, the frequency with which sub-blocks are being accessed, reference (counts for sub-blocks, which user, process, and/or application is accessing certain sub-blocks, and so on. The forensic data may, therefore, facilitate determining how to order indexes, re-creation information, and/or data sub-blocks to increase dedupe performance. For example, sub-blocks may be located in close proximity to items that reference the sub-blocks.

Figure 4:
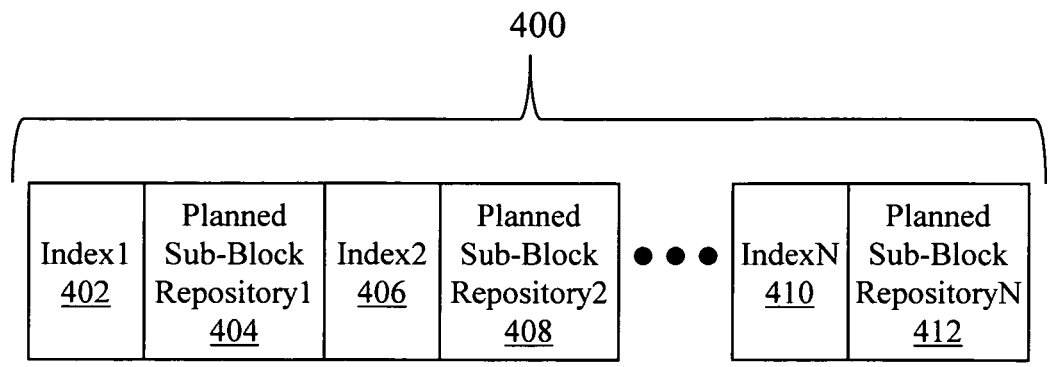
FIG. 4 illustrates a tape layout.

FIG. 4 illustrates one example tape layout that may be produced by example methods and devices. Tape 400 is laid out with a number of indexes and planned sub-block repositories. For example index1 402, which is associated with planned repository1 404, is placed just ahead of repository1 404. Similarly index2 406 is placed just ahead of corresponding repository2 408 and indexN 410 is placed just ahead of corresponding repositoryN 412. Rather than having a single large index that covers all sub-blocks on tape 400, several smaller indexes have been created and distributed across the tape. Similarly, rather than having a single large repository that stores all sub-blocks on tape 400, several smaller repositories have been created and distributed across the tape 400. The smaller indexes are configured to facilitate accessing the subsets of sub-blocks in the smaller repositories. In one example, the size of the indexes and/or repositories may be determined as a function of the size of buffers and/or caches available in a dedupe apparatus that will use sub-blocks stored on tape 400.

In different embodiments, a tape can be configured to store one or more data sets. The data sets may or may not be related. For example, one data set may be associated with a primary (e.g., initial) backup and the related set(s) may be a delta data set associated with a secondary (e.g., subsequent) backup. In another embodiment, a data set(s) may be distributed across two or more tapes.

Observing a dedupe process and data set may reveal an intrinsic dedupe rate associated with how frequently an item is processed (e.g., stored, accessed). In one example, superior dedupe results may be obtained when a sub-block, a subset of sub-blocks, and/or a complete data set is processed multiple times. Processing an item(s) multiple times may lead to a sub-block being stored more than once. Although storing a sub-block more than once appears to defeat storage dedupe, storing a sub-block twice or even three times may lead to substantial reductions in transmission bandwidth dedupe. Also, storing a sub-block two or three times may still be a significant reduction over storing the sub-block one thousand times. Recall that dedupe may be concerned with reducing the amount of data stored and/or with the amount of data transmitted. Storing a sub-block twice to prevent multiple transmissions of the sub-block may be a wise choice. Thus, in some examples, a tape may be laid out with a highest reference count sub-block duplicated in multiple smaller data repositories.

Example methods and devices may ingest data to a temporary area (e.g., RAM, disk) and then dedupe or partially dedupe the data. Partially deduping the data may include, but is not limited to, identifying unique sub-blocks, identifying sub-block access frequency, identifying sub-block reference counts, identifying duplicate sub-blocks, and identifying related sub-blocks. Forensic data about the ingested and partially deduped data may be acquired and analyzed. Then, a tape layout for this particular data set with its particular forensic characteristics may be designed.

Figure 5:
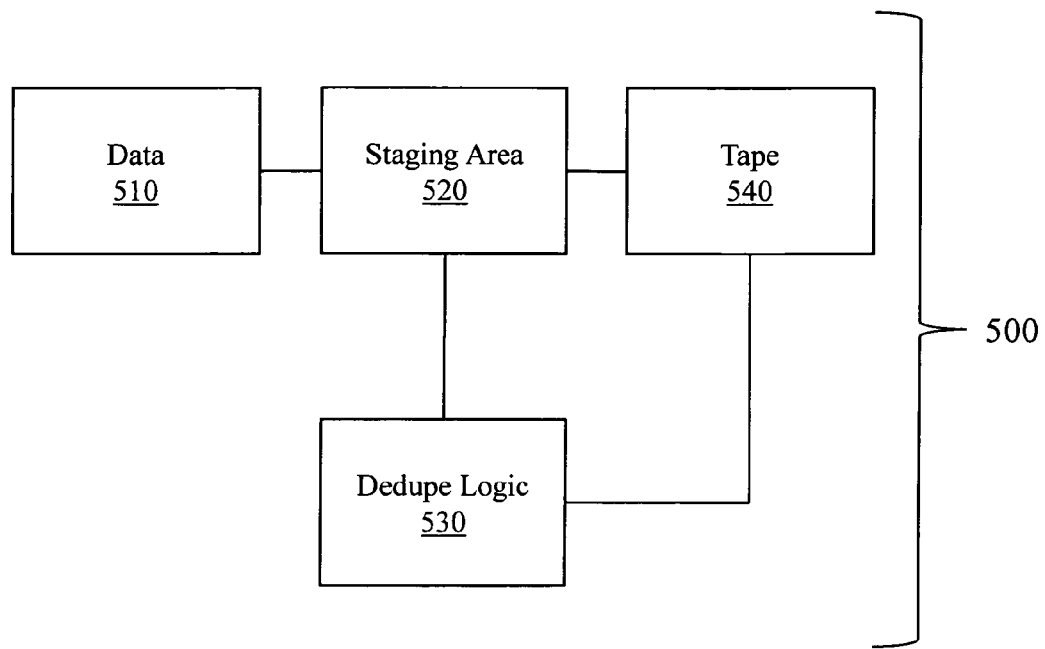
FIG. 5 illustrates a process flow for placing logical portions of a dedupe data set on a tape.

FIG. 5 illustrates a processing flow 500 where data 510 is brought into a staging area 520 for processing by a dedupe logic 530. After the dedupe logic 530 has worked on the data 510 as staged in the staging area 520, the dedupe logic 530 may then decide on a layout for tape 540. This differs from conventional data flows where data is deduped as it is received and stored as it is deduped. Instead of deduping "on the fly", example apparatus and methods may do partial dedupe "in place". In one embodiment, only after completing the partial dedupe would example methods and devices write out the sub-blocks. Deduping in place provides opportunities to acquire forensic data from which the tape layout may be designed. Allowing dedupe logic 530 an opportunity to acquire data, statistics, observations, and other information about data 510 while it is being deduped in staging area 520 facilitates designing a data set specific layout for tape 540.

The dedupe logic 530 may, for example, identify high reference count sub-blocks and design the layout for tape 540 based on the number, type, and character of the high reference count sub-blocks. For example, a data set having a large number of high reference count blocks may lead to a first tape layout while a data set having few or even no high reference count blocks may lead to a second tape layout.

Thus, in one example, a tape layout may be designed where sub-blocks are positioned based on their reference count. For example, highest reference count sub-blocks may be positioned to be read first while lowest reference count sub-blocks may be positioned to be read last. In another example, sub-blocks may be positioned based on their relationships. For example, a basis sub-block may be positioned so that it is read before a delta sub-block that depends on the basis sub-block. In yet another example, sub-blocks that tend to be referenced together may be positioned together. In another example, sub-blocks may be positioned based on a combination or weighted combination of factors including, for example, reference count, access frequency, access groups.

Example methods and devices may also divide re-creation information and/or portions of an index and then distribute the divided out portions to different parts of a tape. In this way, a portion of an index that is relevant to a subset of sub-blocks that are located together on a tape may be positioned near the related subset of sub-blocks. Similarly, re-creation information that is relevant to the subset of sub-blocks that are located together on a tape may be positioned near the related subset of sub-blocks. This positioning may make it more likely that sub-blocks, re-creation information, and index information for useful collections of sub-blocks are all present in RAM at the same time.

In one example, a tape may be divided into logical sections that match or are related to the amount of RAM and/or disk available to a system. In this example, the amount of tape allocated for index, for re-creation information, and for sub-blocks in a logical tape portion may be tailored to increase the likelihood that RAM and/or disk buffering being used by a dedupe system or process will increase buffer hits and reduce buffer misses. Increasing buffer hits while reducing buffer misses can improve dedupe performance. In one example, information concerning the number, location, and sizes of tape portions including index portions, re-creation information portions, and repository portions may be stored on the tape.

In one example, a single larger index may be redesigned to be several smaller indexes, where a single smaller index contains just enough information for re-creation information and sub-blocks stored on a single tape partition. In another example, a smaller index may contain enough information for a number of tape partitions but for less than the entire data set. The smaller index may be rehashed using a different hash function than was used for the general, all-encompassing index. Entries in the smaller index may have fewer bits than entries in the general, all-encompassing index.

In one embodiment, the layout of a repository, index, and/or re-creation information may be controlled by relationships between sub-blocks and sub-blocks and/or by relationships between sub-blocks, re-creation information, and an index portion. The information may be acquired from a partial dedupe of a portion of a data set. The partial dedupe of the portion of the data set may be carried out in a staging area. The staging area may have less storage space than the tape. In one example, the staging area will be completely in RAM. In another example, the staging area may be partially in RAM and partially in another storage medium. The staging area may be associated with, for example, a dedupe server, a redupe server, and other hardware apparatus. "Redupe" refers to re-de-duplicating data, which may involve re-organizing a de-duplicated set to be more suited for the storage medium on which it is stored.

Figure 6:
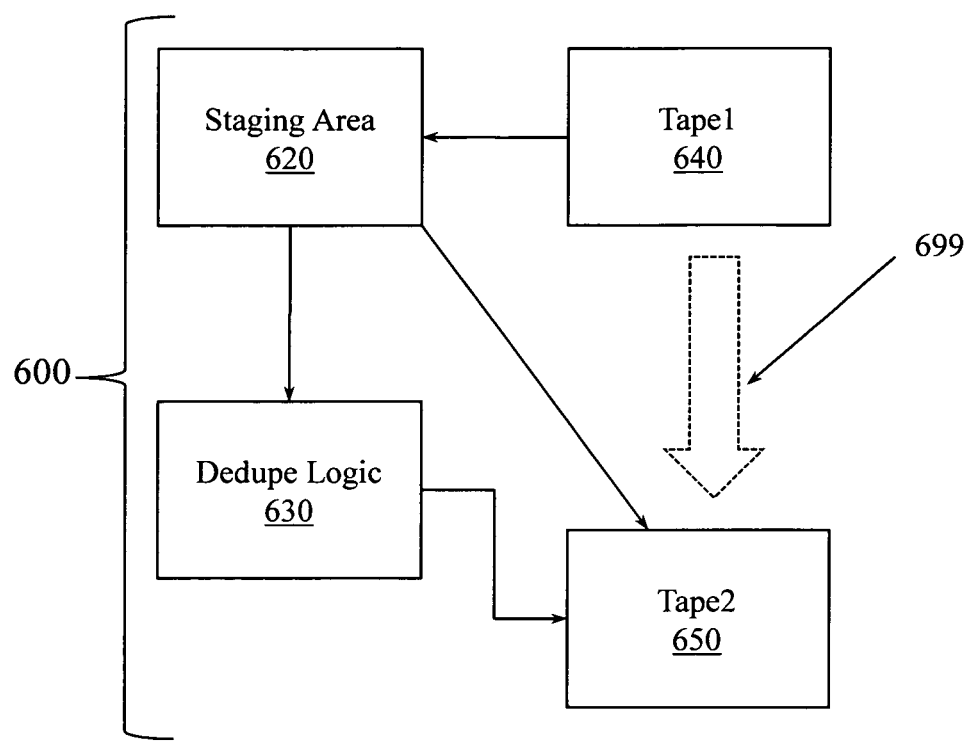
FIG. 6 illustrates a process flow for reorganizing logical portions of a dedupe data set on a tape.

FIG. 6 illustrates a process flow 600 where data on tape1 640 is brought into staging area 620 for processing by dedupe logic 630. If the data on tape1 640 had already been deduped one or more times, then dedupe logic 630 may "redupe" the data and decide on a different layout for tape2 650 based on the redupe. Logically, while a dedupe data set may appear to move from tape1 640 to tape2 650 along flow 699, the data may actually flow through the staging area 620 and dedupe logic 630 before arriving at tape2 650.

Figure 7:
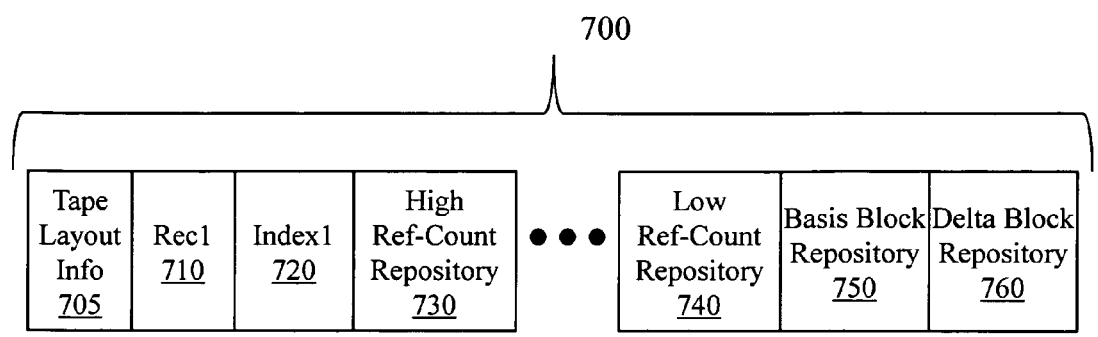
FIG. 7 illustrates a tape layout.

FIG. 7 illustrates another layout for a tape 700. In this layout, re-creation information 710 is placed ahead of an index1 720. Index1 720 may store information about all the sub-blocks on tape 700. The sub-blocks may be ordered based on dedupe attributes acquired by observing the dedupe and/or redupe of the data set. Thus, in FIG. 7, a high reference count repository 730 is positioned ahead of a low reference count repository 740. Additionally, a basis block repository 750 is positioned ahead of a delta block repository 760. The types, sizes, and positions of repositories may be controlled by dedupe attributes observed during dedupe and/or redupe. In one embodiment, tape layout information 705 may be stored on tape 700.

Figure 8:
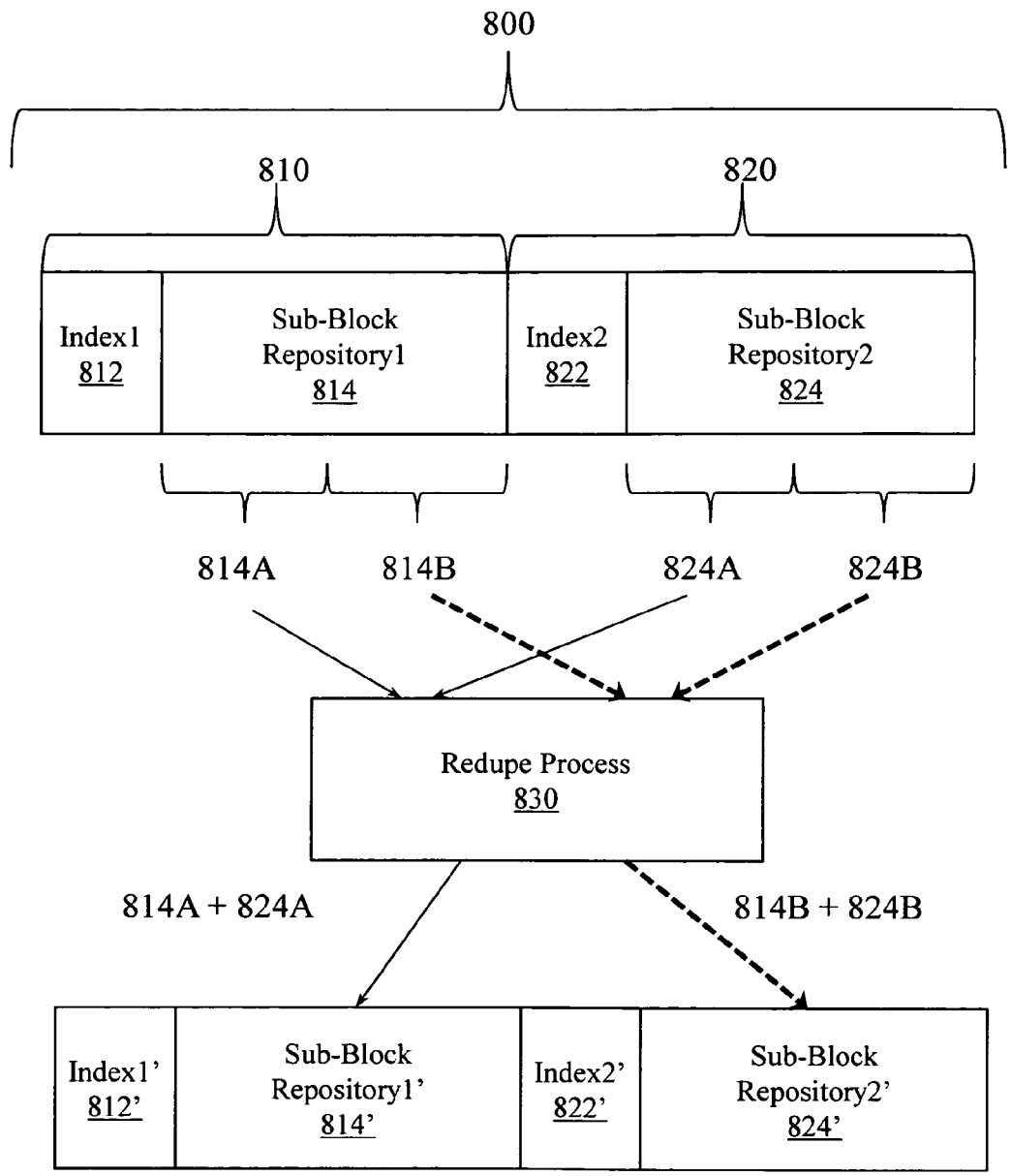
FIG. 8 illustrates a tape being reorganized as part of a re-de-duplication (redupe) process.

FIG. 8 illustrates an example of how redupe may reorganize sub-blocks on a tape 800. Tape 800 may have originally been laid out with a first logical partition 810 and a second logical partition 820. First logical partition 810 may have included an index1 812 and a sub-block repository1 814. Similarly, second logical partition 820 may have included an index2 822 and a sub-block repository2 824. The repositories may have been organized so that more frequently accessed sub-blocks are positioned near the front of the repository and so that less frequently accessed sub-blocks are positioned near the back of the repository.

Redupe process 830 may be configured to process the data on tape 800 to reposition more of the most frequently accessed sub-blocks in a first repository and to reposition more of the less frequently accessed sub-blocks in a second repository. While access frequency is described as the attribute upon which a redupe controlled reorganization may be performed, one skilled in the art will appreciate that other attributes (e.g., reference count, access group) may control a redupe and reorganization.

Redupe process 830 may read an initial portion 814A from repository1 814 and may also read an initial portion 824A from repository2 824. Redupe process 830 may then reorganize these sub-blocks into sub-block repository1' 814' and may index these entries into index1' 812'. Similarly, redupe process 830 may read a latter portion 814B from repository1 814 and read a latter portion 824B from repository2 824. Redupe process 830 may then reorganize these sub-blocks into sub-block repository2' 824' and index these entries into index2' 822'. Consider that tape 800 may have been laid out one logical partition at a time based on the size of the temporary area available to a dedupe apparatus when the data was initially deduped. Thus, while repository 814 may have achieved some local optimization, and while repository 824 may have achieved some local optimization, redupe process 830 facilitates achieving more global optimization. Once again, however, redupe process 830 may be constrained by the size of the temporary area into which data can be brought for redupe processing. Recall that tape sizes typically dwarf the amount of RAM available in a dedupe apparatus.

In one embodiment, the partial dedupe or redupe of the portion of the data set may be carried out as an offline process on a replicated data set. For example, a high speed tape replication may be performed to produce a duplicate tape. The duplicate tape may then be processed by a redupe server that is not serving live data but that is tasked with optimizing the tape format. After one or more redupe sessions, the tape may be swapped back into the live system, replacing the tape from which the replicated tape was produced. In this way, dedupe optimization may be achieved while dedupe serving continues and the transfer may be seamless.

The following includes definitions of selected terms employed herein. The definitions include various examples and/or forms of components that fall within the scope of a term and that may be used for implementation. The examples are not intended to be limiting. Both singular and plural forms of terms may be used within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

Figure 9:
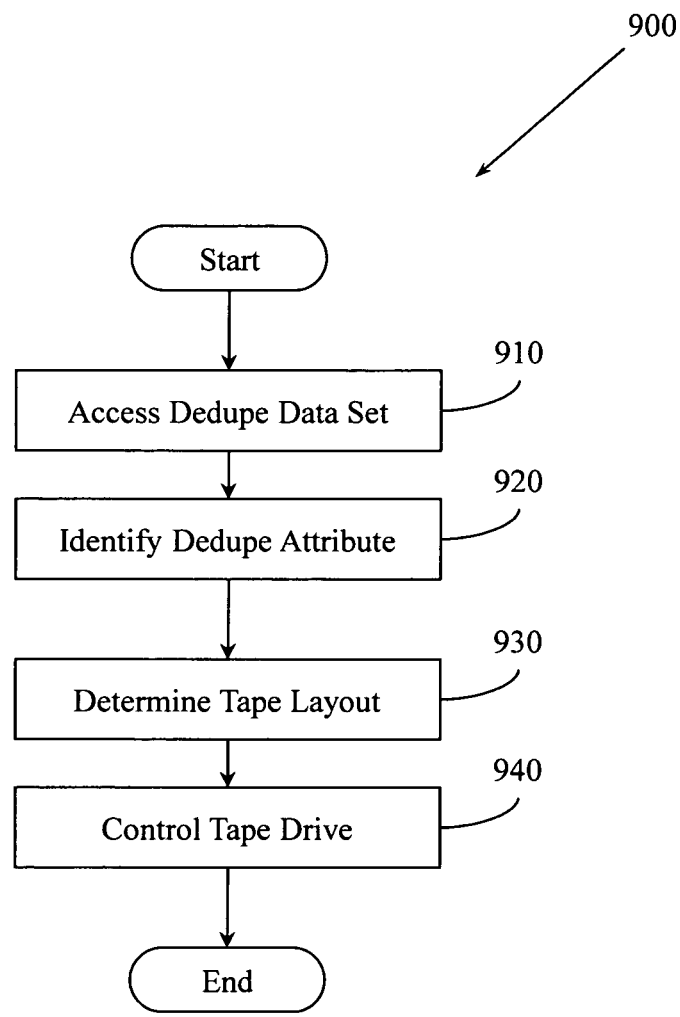
FIG. 9 illustrates a flow chart for a method associated with controlling a tape layout for a tape used in de-duplication.

FIG. 9 illustrates a method 900 associated with controlling a tape layout for a tape used in dedupe. Method 900 includes, at 910, accessing a de-duplication data set. The de-duplication data set may include items including, but not limited to, a set of sub-blocks produced by a de-duplication process, an index produced by the de-duplication process, and re-creation information produced by the de-duplication process. The index may store index entries related to members of the set of sub-blocks and the re-creation information may store data for re-creating a larger data block from two or more sub-blocks in the set of sub-blocks.

In one example, the set of sub-blocks may have been parsed into sub-blocks by the de-duplication process but may not have had duplicate sub-blocks removed. In another example, the set of sub-blocks may have had at least one duplicate removed by the de-duplication process. Thus, method 900 may process dedupe data sets that are at different stages of maturity in the dedupe process.

In one example, accessing the de-duplication data set may include controlling a tape drive to read the de-duplication data set from a tape. In this embodiment, information about a tape layout may also be acquired from the tape. In another example, accessing the de-duplication data set may include controlling another storage device (e.g., disk, memory) to provide the dedupe data set.

In one example, accessing the de-duplication data set may include controlling a device to ingest the set of sub-blocks into a temporary de-duplication work area. The temporary de-duplication work area may be located in random access memory (RAM) associated with the computer executing the method. The size of the temporary de-duplication work area may be less than the size of the tape to which the data set will be written. Thus, a complete data set on a tape may be read into the temporary de-duplication work area one subset at a time. Dedupe information may be acquired by analyzing the data that is "parked" in the temporary dedupe work area.

As illustrated in FIG. 8, data sets may be reduped to facilitate reorganizing a tape layout to potentially achieve greater optimization. Thus, in one example, the de-duplication data set may include a portion of a first logical partition of a previous de-duplication data set previously written to tape according to a previous tape-specific layout and a portion of a second logical partition of the previous de-duplication data set written to the tape according to the previous tape-specific layout.

Method 900 also includes, at 920, identifying a de-duplication attribute associated with the de-duplication data set. In different examples, the de-duplication attribute may be related to facts including, but not limited to, a sub-block reference count, a sub-block access order, a sub-block access frequency, a sub-block access group relationship, a sub-block basis/delta relationship, a sub-block accessing entity identity, an indexing parameter, and a re-creation information parameter. This data may be acquired without actually deduping (e.g., removing any sub-blocks) the data set while it resides in the temporary dedupe work area.

As described above, the data set may be at different levels of maturity in the dedupe process. For example, it may have been partially deduped, it may have been deduped once, or it may have been deduped several times and used as live data for an extended period of time. Therefore, identifying the de-duplication attribute may be performed as part of processes including, but not limited to, a partial de-duplication of the set of sub-blocks, a re-de-duplication of the set of sub-blocks, and a complete de-duplication of the set of sub-blocks. In one embodiment, the dedupe attribute may be acquired without removing, replacing, or even reworking any sub-blocks but rather may be acquired by analyzing the already deduped data set. It may be desirable to work on replicated data rather than on live data while determining a tape layout. Therefore, in different examples, the partial de-duplication of the set of sub-blocks, the re-de-duplication of the set of sub-blocks, or the complete de-duplication of the set of sub-blocks may be performed on replicated data.

Method 900 also includes, at 930, determining a tape-specific layout for at least a portion of the de-duplication data set based, at least in part, on the de-duplication attribute. The tape-specific layout may identify items including, but not limited to, a sub-block order on the tape, a number of sub-block partitions on the tape, a location for a sub-block partition on the tape, a number of index partitions on the tape, a location for an index partition on the tape, a number of re-creation information partitions on the tape, and a location for an information partition on the tape.

In one example, the tape-specific layout may additionally be based, at least in part, on a buffer scheme associated with a de-duplication apparatus that will access the de-duplication data set. In this example, the tape-specific layout may include at least one logical partition sized as a function of the amount of random access memory available to the de-duplication apparatus and as a function of a buffering scheme employed by the de-duplication apparatus. Similarly, the tape-specific layout may include at least one logical partition sized as a function of the amount of disk space available to the de-duplication apparatus and as a function of a buffering scheme employed by the de-duplication apparatus.

Determining the tape-specific layout may involve partitioning larger data structures into multiple smaller data structures. Therefore, in one example, determining the tape-specific layout may include partitioning a portion of the index into at least two indexes and determining different locations on the tape for the at least two indexes. Similarly, determining the tape-specific layout may include partitioning a portion of the re-creation information into at least two portions of re-creation information and determining different locations on the tape for the at least two portions of re-creation information. Likewise, determining the tape-specific layout may include partitioning the set of sub-blocks into at least two subsets of sub-blocks and determining different locations on the tape for the at least two subsets of sub-blocks. Different embodiments may include different combinations of partitioning an index, partitioning re-creation information, and partitioning subsets of sub-blocks.

When a larger index is split into smaller indexes, determining the tape layout may also cause re-indexing of sub-blocks in the set of sub-blocks to account for the at least two indexes. In one embodiment, an index entry in one of the at least two indexes is smaller than an index entry in the original, larger index. In this way, space may be saved as compared to conventional systems.

Method 900 also includes, at 940, controlling a tape drive to write at least a portion of the de-duplication data set to a first tape according to the tape-specific layout. In one embodiment, method 900 may also include writing information about the tape layout to the tape.

Figure 10:
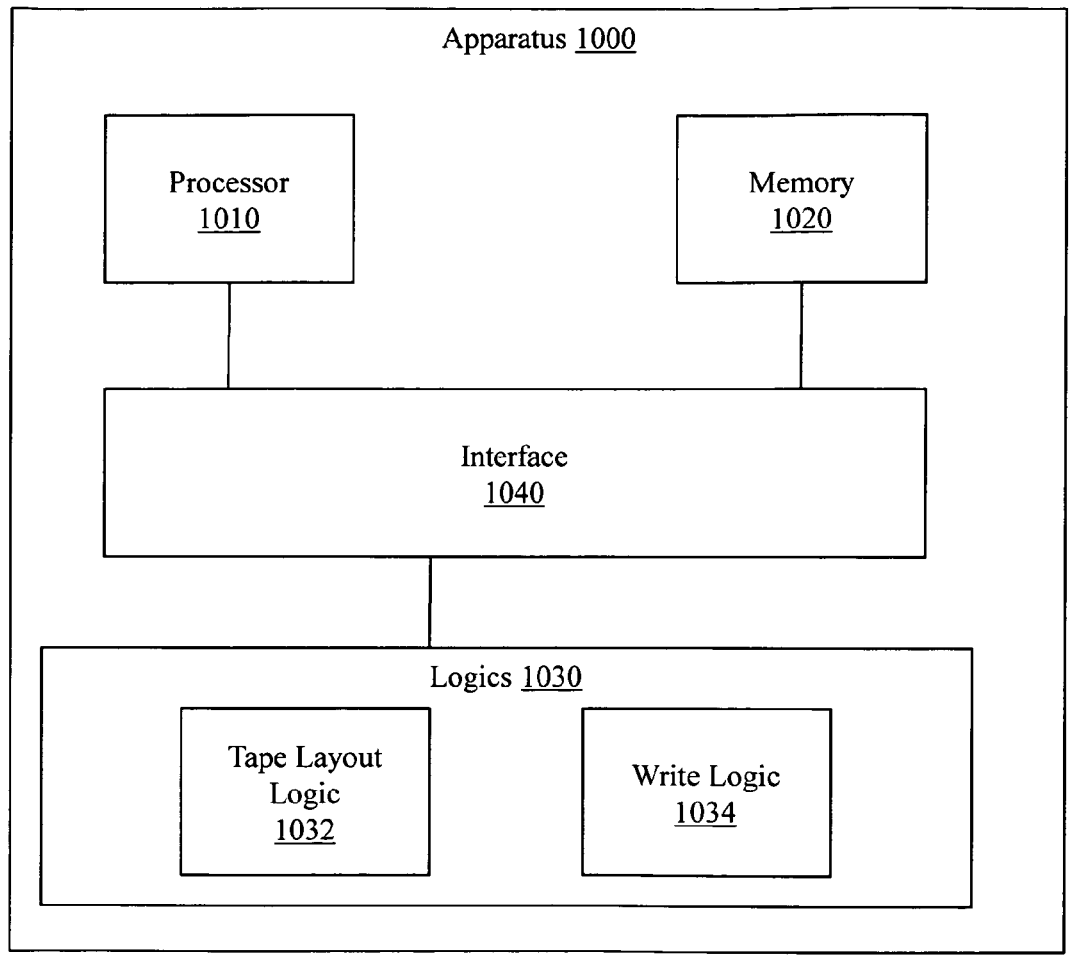
FIG. 10 illustrates an apparatus configured to perform processing associated with controlling a tape layout for a tape used in de-duplication.

FIG. 10 illustrates an apparatus 1000 that is configured to perform processing associated with a tape based de-duplication repository. Apparatus 1000 includes a processor 1010, a memory 1020, a set of logics 1030 and an interface 1040 that is configured to connect the processor 1010, the memory 1020, and the set of logics 1030.

The set of logics 1030 may include a tape layout logic 1032 and a write logic 1034. The tape layout logic 1032 may be configured to determine a tape-specific layout for a de-duplication data set based on forensic data acquired for the de-duplication data set. In one example, the tape layout logic 1032 is configured to determine the tape-specific layout based on factors revealed in the forensic data. The factors can include, but are not limited to, observed de-duplication operation data, tape capacity, tape configuration, tape drive operating parameters, and observed de-duplication processing parameters. The observed de-duplication operation data may identify items including, but not limited to, a sub-block reference count, a sub-block access order, a sub-block access frequency, a sub-block access group relationship, a sub-block basis/delta relationship, a sub-block accessing entity identity, an indexing parameter, and a re-creation information parameter. The observed de-duplication processing parameters can include, but are not limited to, a de-duplication pre-fetch scheme, a de-duplication buffering scheme, and a de-duplication apparatus buffering capacity. In one embodiment, memory 1020 can include a temporary dedupe area into which data can be read to be analyzed by tape layout logic 1032. Tape layout logic 1032 may then perform dedupe related activities on the temporarily stored data and, in one example, do so without removing any sub-blocks at that time. Thus, tape layout logic 1032 may "pre-dupe" (pre-de-duplicate) and/or "re-dupe" (re-de-duplicate) data that has been temporarily stored in order to acquire data from which a tape layout can be designed.

The write logic 1034 may be configured to write the de-duplication data set to a tape according to the tape-specific layout. In one example, the tape-specific layout can control tape layout attributes including, but not limited to, a number of index partitions on the tape, a location of an index partition on the tape, a number of re-creation information partitions on the tape, a location of a re-creation information partition on the tape, a number of sub-block groups on the tape, a location of a sub-block group on the tape, and an order of sub-blocks on the tape. The write logic 1034 may write information about the tape layout to the tape or to other locations.

While example devices, apparatus, systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B), the term "or" is intended to mean "A or B or both". The phrase "only A or B but not both" indicates that "only A or B but not both" is to be employed. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable medium storing computer-executable instructions that when executed by a computer control the computer to perform a method, the method comprising:
    accessing a de-duplication data set, where the de-duplication data set includes a set of sub-blocks produced by a de-duplication process, an index produced by the de-duplication process, where the index stores index entries related to members of the set of sub-blocks, and re-creation information produced by the de-duplication process, where the re-creation information stores data for re-creating a larger data block from two or more sub-blocks in the set of sub-blocks;
    identifying a de-duplication attribute associated with the de-duplication data set; determining a tape-specific layout for at least a portion of the de-duplication data set based, at least in part, on the de-duplication attribute and on a buffer scheme associated with a de-duplication apparatus that will access the de-duplication data set; and
    controlling a tape drive to write at least a portion of the de-duplication data set to a first tape according to the tape-specific layout.

2. The computer-readable medium of claim 1, where the set of sub-blocks has been parsed into sub-blocks by the de-duplication process but has not had duplicate sub-blocks removed.

3. The computer-readable medium of claim 1, where the set of sub-blocks has had at least one duplicate removed by the de-duplication process.

4. The computer-readable medium of claim 1, where accessing the de-duplication data set comprises controlling a tape drive to read the de-duplication data set from a second tape.

5. The computer-readable medium of claim 1, where the de-duplication attribute is related to one or more of, a sub-block reference count, a sub-block access order, a sub-block access frequency, a sub-block access group relationship, a sub-block basis/delta relationship, a sub-block accessing entity identity, an indexing parameter, and a re-creation information parameter.

6. The computer-readable medium of claim 1, where accessing the de-duplication data set comprises ingesting the set of sub-blocks into a temporary de-duplication work area, where the temporary de-duplication work area is located in random access memory associated with the computer executing the method, and where the size of the temporary de-duplication work area is less than the size of the first tape.

7. The computer-readable medium of claim 6, where identifying the de-duplication attribute is performed by analyzing the set of sub-blocks in the temporary de-duplication work area.

8. The computer-readable medium of claim 7, where the set of sub-blocks are analyzed in the temporary de-duplication work area before sub-blocks are written to the first tape according to the tape-specific layout.

9. The computer-readable medium of claim 1, where identifying the de-duplication attribute is performed as part of one or more of, a pre-de-duplication of the set of sub-blocks, a partial de-duplication of the set of sub-blocks, a re-de-duplication of the set of sub-blocks, and a complete de-duplication of the set of sub-blocks.

10. The computer-readable medium of claim 9, where one or more of, the pre-de-duplication of the set of sub-blocks, the partial de-duplication of the set of sub-blocks, the re-de-duplication of the set of sub-blocks, and the complete de-duplication of the set of sub-blocks is performed on replicated data.

11. The computer-readable medium of claim 1, where the tape-specific layout identifies one or more of, a sub-block order on the tape, a number of sub-block partitions on the tape, a location for a sub-block partition on the tape, a number of index partitions on the tape, a location for an index partition on the tape, a number of re-creation information partitions on the tape, and a location for an information partition on the tape.

12. The computer-readable medium of claim 1, where the tape-specific layout includes at least one logical partition sized as a function of the amount of random access memory available to the de-duplication apparatus and as a function of a buffering scheme employed by the de-duplication apparatus.

13. The computer-readable medium of claim 1, where the tape-specific layout includes at least one logical partition sized as a function of the amount of disk space available to the de-duplication apparatus and as a function of a buffering scheme employed by the de-duplication apparatus.

14. The computer-readable medium of claim 1, where determining the tape-specific layout comprises partitioning a portion of the index into at least two indexes and determining different locations on the tape for the at least two indexes.

15. The computer-readable medium of claim 1, where determining the tape-specific layout comprises partitioning a portion of the re-creation information into at least two portions of re-creation information and determining different locations on the tape for the at least two portions of re-creation information.

16. The computer-readable medium of claim 1, where determining the tape-specific layout comprises partitioning the set of sub-blocks into at least two subsets of sub-blocks and determining different locations on the tape for the at least two subsets of sub-blocks.

17. The computer-readable medium of claim 1, where determining the tape-specific layout comprises partitioning a portion of the index into at least two indexes and determining different locations on the tape for the at least two indexes, partitioning a portion of the re-creation information into at least two portions of re-creation information and determining different locations on the tape for the at least two portions of re-creation information, and partitioning the set of sub-blocks into at least two subsets of sub-blocks and determining different locations on the tape for the at least two subsets of sub-blocks.

18. The computer-readable medium of claim of claim 14, comprising re-indexing sub-blocks in the set of sub-blocks as a function of the at least two indexes.

19. The computer-readable medium of claim 18, where an index entry in one of the at least two indexes is smaller than an index entry in the index.

20. The computer-readable medium of claim 1, where the de-duplication data set comprises a portion of a first logical partition of a previous de-duplication data set previously written to a previous tape according to a previous tape-specific layout and a portion of a second logical partition of the previous de-duplication data set written to the previous tape according to the previous tape-specific layout.

21. The computer-readable medium of claim 1, the method comprising writing information about the tape-specific layout to the tape.

22. An apparatus, comprising:
a processor;
a memory;
a set of logics; and
an interface to connect the processor, the memory, and the set of logics, the set of logics comprising:
    a tape layout logic configured to determine a tape-specific layout for a de-duplication data set based on forensic data acquired for the de-duplication data set, where the de-duplication data set includes a set of sub-blocks produced by a de-duplication process, an index produced by the de-duplication process, where the index stores index entries related to members of the set of sub-blocks, and re-creation information produced by the de-duplication process, and where the re-creation information stores data for re-creating a larger data block from two or more sub-blocks in the set of sub-blocks, and
    where determining the tape specific layout includes identifying a de-duplication attribute associated with the de-duplication data set and determining the tape-specific layout for at least a portion of the de-duplication data set based, at least in part, on the de-duplication attribute and on a buffer scheme associated with a de-duplication apparatus that will access the de-duplication data set; and
    a write logic configured to write the de-duplication data set to a tape according to the tape-specific layout.

23. The apparatus of claim 22, where the tape layout logic is configured to determine the tape-specific layout based on one or more of, observed de-duplication operation data, tape capacity, tape configuration, tape drive operating parameters, and observed de-duplication processing parameters.

24. The apparatus of claim 23, where the observed de-duplication operation data identifies one or more of, a sub-block reference count, a sub-block access order, a sub-block access frequency, a sub-block access group relationship, a sub-block basis/delta relationship, a sub-block accessing entity identity, an indexing parameter, and a re-creation information parameter.

25. The apparatus of claim 23, where the observed de-duplication processing parameters include one or more of, a de-duplication pre-fetch scheme, a de-duplication buffering scheme, and a de-duplication apparatus buffering capacity.

26. The apparatus of claim 22, where the tape-specific layout controls one or more of, a number of index partitions on the tape, a location of an index partition on the tape, a number of re-creation information partitions on the tape, a location of a re-creation information partition on the tape, a number of sub-block groups on the tape, a location of a sub-block group on the tape, and an order of sub-blocks on the tape.

27. The apparatus of claim 22, where the write logic is configured to write information about the tape-specific layout to the tape.

28. The apparatus of claim 22, where the tape layout logic is configured to position portions of the de-duplication data set in the memory and to control the processor to generate the forensic data in response to analyzing the de-duplication data set in the memory as the de-duplication data set is at least partially de-duplicated in place.

* * * * *